United States Patent
Ewert

(10) Patent No.: US 11,544,934 B2
(45) Date of Patent: Jan. 3, 2023

(54) METHOD FOR OPERATING AN ENVIRONMENT SENSOR SYSTEM OF A VEHICLE AND ENVIRONMENT SENSOR SYSTEM

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

(*) Notice: Subject to any disclaimer, the term of this patent is extended or adjusted under 35 U.S.C. 154(b) by 108 days.

(21) Appl. No.: 16/900,042

(22) Filed: Jun. 12, 2020

(65) Prior Publication Data
US 2020/0410253 A1  Dec. 31, 2020

(30) Foreign Application Priority Data

Jun. 26, 2019 (DE) .......................... 102019209292.6

(51) Int. Cl.
| | | |
|---|---|---|
| *G06V 10/82* | (2022.01) | |
| *G06V 20/56* | (2022.01) | |
| *B60W 60/00* | (2020.01) | |
| *G06V 10/75* | (2022.01) | |

(52) U.S. Cl.
CPC .......... *G06V 20/56* (2022.01); *B60W 60/001* (2020.02); *G06V 10/751* (2022.01); *G06V 10/82* (2022.01); *B60W 2420/42* (2013.01)

(58) Field of Classification Search
CPC ............... B60W 50/02; B60W 60/001; G06K 9/00791; G06K 9/6202
See application file for complete search history.

(56) References Cited

U.S. PATENT DOCUMENTS

| | | | |
|---|---|---|---|
| 9,018,577 B2* | 4/2015 | Lu ............................. | G06T 7/80 |
| | | | 250/221 |
| 9,507,346 B1* | 11/2016 | Levinson ............. | G05D 1/0291 |
| 10,007,269 B1* | 6/2018 | Gray ..................... | G05D 1/0077 |
| 2003/0165268 A1* | 9/2003 | Franz ........................ | G06T 7/00 |
| | | | 382/181 |
| 2019/0004543 A1 | 1/2019 | Kennedy et al. | |
| 2019/0068829 A1* | 2/2019 | Van Schoyck ........ | G01C 21/165 |
| 2019/0109988 A1* | 4/2019 | Lin ........................... | G06T 7/33 |
| 2020/0134800 A1* | 4/2020 | Hu ........................ | G06K 9/6202 |
| 2021/0064980 A1* | 3/2021 | Heinrich .............. | G06K 9/6262 |
| 2021/0229697 A1* | 7/2021 | Lee ........................ | B60W 30/09 |
| 2022/0001858 A1* | 1/2022 | Futatsugi ............... | G06N 3/063 |
| 2022/0172487 A1* | 6/2022 | Ewert .................... | G01S 15/931 |

* cited by examiner

*Primary Examiner* — Ian L Lemieux
(74) *Attorney, Agent, or Firm* — Norton Rose Fulbright US LLP; Gerard Messina

(57) ABSTRACT

A method for operating an environment sensor system of a vehicle, in particular of an autonomous motor vehicle, and an environment sensor system. The method includes the steps: producing first image data from a first image of a vehicle environment with the aid of a first sensor, performing a setpoint-actual comparison of the first image data with the second image data, and recognizing an operability of the environment sensor system based on the setpoint-actual comparison, the second image data including standard image data and/or image information from a second image of the vehicle environment, and the operability being recognized with the aid of a first artificial intelligence.

14 Claims, 2 Drawing Sheets

METHOD FOR OPERATING AN ENVIRONMENT SENSOR SYSTEM OF A VEHICLE AND ENVIRONMENT SENSOR SYSTEM

CROSS REFERENCE

The present application claims the benefit under 35 U.S.C. § 119 of German Patent Application No. DE 102019209292.6 filed on Jun. 26, 2019, which is expressly incorporated herein by reference in its entirety.

FIELD

The present invention relates to a method for operating an environment sensor system of a vehicle and to an environment sensor system.

BACKGROUND INFORMATION

In the course of developments in the field of autonomous driving of vehicles, environment sensors are increasing in number and relevance. These are used for example for various driver assistance systems and the like. When operating the vehicle, the function of the environment sensor system may be impaired regularly by contamination with insects, water droplets or dust. If such contamination is not detected or not detected in a timely manner, unfavorable driving situations or an impairment of the driving comfort may occur.

SUMMARY

An example method according to the present invention for operating an environment sensor system includes a simple and reliable recognition of impairments of the sensor operation. In particular, it is thereby possible to detect contaminations and other impairments of the environment sensor system such as for example partial or complete defects of a sensor. This makes it possible to ascertain in a simple and reliable manner whether or not the environment sensor system functions properly. According to an example embodiment of the present invention, this is achieved by a method for operating an environment sensor system of a vehicle, which comprises the following steps:
  generating first image data from a first image of a vehicle environment using a first sensor,
  performing a setpoint-actual comparison of the first image data with second image data, and
  recognizing a operability of the environment sensor system based on the setpoint-actual comparison,
  the operability being recognized with the aid of a first artificial intelligence.

The environment sensor system is preferably an environment sensor system of an autonomous motor vehicle. An autonomous motor vehicle is a motor vehicle, preferably a passenger car, which is designed for fully automated driving, or VAF, and/or also for partially automated driving, also called highly automated driving, or HAF. The environment sensor system is thus designed in particular to analyze the first image data and subsequently to provide the analysis to at least one driver assistance system of the vehicle. The analysis of the first image data is preferably likewise performed by the first artificial intelligence and may comprise an object recognition for example.

The first artificial intelligence is designed to analyze the first image data with the aid of a setpoint-actual comparison and to recognize the operability of the first sensor on the basis of this analysis. For example, the first artificial intelligence may recognize unchanged image data areas, or particularly bright or dark areas of the first image data and infer from this a contamination or a partial or complete defect of the first sensor.

Diverse image data may be used as second image data. It is possible for example to use a second image of the environment of the vehicle as second image data, for example at another point in time, and preferably when the vehicle is moving. Alternatively or additionally, it is possible to use for example standard image data as second image data. The standard image data preferably may be one or multiple images of a standard surface. The standard surface may be for example a surface having a uniform, very bright or very dark color, preferably white or black. Particularly preferably, the standard image data are one or multiple images of the standard surface, which were recorded for example by the first sensor at a predefined distance and a predefined position and at predefined lighting conditions. Alternatively or additionally, the standard image data may have for each pixel of the first sensor predefined signal values such as a predefined standard signal strength and/or a predefined standard noise value, for example. Using the standard image data, the artificial intelligence is able to detect the operability of the environment sensor system in a particularly simple manner by detecting, for example on the basis of the setpoint-actual comparison, whether the first image data have realistic and meaningful image information. Preferably, this may be carried out for example while the vehicle is at a standstill. Additionally or alternatively, this may also be carried out during a driving operation of the vehicle. Furthermore, the standard image data preferably also make it easier for the artificial intelligence to recognize pixels that are always unchanging, in particular while the vehicle is moving, whereby a particularly high accuracy and reliability is achieved in the detection of the operability of the environment sensor system.

Alternatively or additionally, the second image data may include image information from a second image of a vehicle environment. This yields a particularly simple possibility of performing the setpoint-actual comparison, for example essentially as a simple image comparison of two images of the vehicle environment and to analyze this setpoint-actual comparison with the aid of the first artificial intelligence. This additionally makes it possible to achieve a particularly high accuracy when recognizing the operability of the environment sensor system.

The artificial intelligence may comprise, in particular, a neural network. Preferably, a repeated execution of the method makes it possible to train this neural network with greater data quantities in order obtain a particularly high performance and diagnostic reliability of the method.

The first sensor is preferably an optical sensor, such as a camera or a LiDAR sensor for example. Alternatively, other sensor types are also possible as first sensor, which are suitable for detecting an environment of the vehicle, as a radar sensor for example.

In a simple manner, the example method thus allows for a particularly reliable recognition of a operability of the environment sensor system. The example method makes it possible for example to recognize already smaller contaminations or defects of the environment sensor system early so as to obtain insight regarding an accuracy and quality of the first image data. In particular, it is also possible to ascertain a functional accuracy of the environment sensor system in the process. Preferably, measures may be initiated in the method as a function of the operability of the environment sensor system in order to optimize the reliability and/or quality and/or accuracy of the first image data.

Preferred developments of the present invention are described herein.

The operability is preferably recognized separately for each pixel of the first sensor. This makes it possible to ascertain the operability, and in particular the functional accuracy, of the environment sensor system in a particularly precise fashion. Particularly advantageously, this makes it possible to determine a degree of the operability of the environment sensor system. Preferably, this also makes it possible to determine a degree of contamination and/or a degree of a defect of the environment sensor system.

The method preferably also comprises the following step:
deactivating defective pixels of the first sensor. This allows for a continued high accuracy of the remaining operable parts even when the environment sensor system is partially not operable. Defective pixels are in particular those pixels that were detected to be inoperable. By deactivating the pixels that are defective for example because of contamination or defect, these pixels are prevented from producing image data that falsify the further image data of the remaining, fully operable pixels.

The method preferably also comprises the following step:
extrapolating defective pixels. The environment sensor system thus continues to provide a base performance, for example in a recognition of objects, even in a partial contamination or when multiple pixels are defective.

The extrapolation of the defective pixels is preferably performed by the first artificial intelligence. Alternatively or additionally, the extrapolation may be performed by a second artificial intelligence, in particular one that is independent of the first artificial intelligence, in order to allow for a particularly quick and efficient analysis of the first image data.

It is particularly preferable if the extrapolation is performed using image information of adjacent pixels. For this purpose, preferably at least one, preferably directly, adjacent pixel is used for each defective pixel. A signal strength and/or a noise value and/or other signals of the adjacent pixels are used as image information for example in order to perform the extrapolation. A particularly high accuracy of the first image data following the extrapolation is made possible thereby.

Furthermore, it is particularly favorable, if the extrapolation is performed using third image data of a second sensor of the environment sensor system. Preferably, prior to the step of extrapolation, an operability of the second sensor is ascertained, and in particular only image information of operable pixels of the second sensor are used for the extrapolation. It is particularly favorable if the first image data and the second image data are transformed and in particular superimposed on each other by the first artificial intelligence in a common vehicle coordinate system in order to produce common vehicle image data. Advantageously, it is additionally possible for this purpose to use still further sensors and image data produced by these further sensors.

Particularly preferably, the first artificial intelligence and/or the second artificial intelligence are used to detect image data areas that are unchanged over time, in particular while the vehicle is moving. The image data areas respectively detected as unchanged over time are classified as defective. For this purpose, particularly partial areas of the image data, which may be one or multiple pixels of the sensor for example, are regarded as image data areas. This offers a particularly simple possibility for recognizing the operability of the environment sensor system.

The second image of the vehicle environment is preferably produced at a different point in time than the first image. It is particularly advantageous if the first image and the second image are produced during a driving operation, that is, while the vehicle is moving. The second image is particularly preferably produced at least 0.1 seconds, in particular 2 seconds, and preferably 60 seconds after the first image. Alternatively, it is also advantageous if the second image is produced several minutes, for example 5 minutes or 10 minutes, or several hours, for example 2 hours, later than the first image, in order to obtain a random functional test of the environment sensor system.

The present invention furthermore yields a method for operating a vehicle, in particular an autonomous motor vehicle. In accordance with the present invention, an example method for operating the vehicle comprises the following steps:

operating an environment sensor system of the vehicle using the method described above for operating the environment sensor system, and deactivating predetermined driving functions of the vehicle if the operability of the environment sensor system is not given. The deactivation of the predetermined driving functions preferably occurs if a degree of the operability is smaller than a predetermined degree of operability, in particular smaller than 50%. Preferably, a percentage of a fully operable partial area and/or a percentage of fully operable pixels of the first sensor is regarded as a degree of operability. That is to say, if for example 50% or more of the pixels of the first sensor are classified as defective, being contaminated for example, it is in particular assumed that the first sensor is no longer able to detect the environment of the vehicle with sufficient quality. In response, driving functions, preferably autonomous driving functions, of the vehicle are deactivated in order to avoid unfavorable driving situations. Such a driving function may be an adaptive cruise control, for example. It is particularly favorable in this regard if the environment sensor system is operated and monitored, in particular continuously, during a driving operation and the predetermined driving functions are deactivated if indicated. Alternatively or additionally, it is particularly advantageous if the method for operating the vehicle is executed while the vehicle is at a standstill, preferably prior to driving off, that is, for example in response to a start of the drive motor. Alternatively or in addition to the step of deactivating the autonomous driving function, the following step may be performed if the first sensor is recognized as defective:

switching an environment detection to an intact, in particular redundant, third sensor. Preferably, this intact third sensor has the same sensing principle and/or has the same direction of view as the first sensor, for example in the direction of travel. This allows for a continued detection of the environment and a recognition of the environment during the driving operation.

The present invention furthermore yields an example evaluation unit, which comprises a first artificial intelligence. The example evaluation unit is designed to receive first image data from an image of a vehicle environment from a first sensor and to perform a setpoint-actual comparison of the first image data with second image data. The evaluation unit is further designed to recognize an operability of an environment sensor system, which comprises in particular the first sensor, using the first artificial intelligence, based on the setpoint-actual comparison. For this purpose, the second image data have standard image data and/or image information from a second image of the vehicle environment. The evaluation unit thus has a simple structure and allows for a particularly reliable assessment of the operability and thus in particular also of a reliability and quality of the detected image data. In particular, it is thereby possible to detect possible contaminations and/or partial or complete defects of the environment sensor system.

The example evaluation unit is preferably designed to recognize the operability separately for each pixel of the first sensor in order to be able to determine the operability, and in particular the functional accuracy, of the environment sensor system in a particularly accurate manner.

It is particularly advantageous if the first image data have a signal strength of pixels of the first sensor. Alternatively or additionally, the first image data have a noise value, in particular of the detected image of the vehicle environment. The evaluation unit is designed to detect the signal strength and/or the noise value and to analyze these using the artificial intelligence in order to recognize the operability of the environment sensor system. It is thus possible to detect the operability of the environment sensor system in a particularly simple and reliable manner.

The present invention furthermore yields an example environment sensor system of a vehicle, in particular of an autonomous motor vehicle. The example environment sensor system comprises a first sensor and the above-described evaluation unit. The first sensor is designed to produce first image data from an image of a vehicle environment. For this purpose, the first sensor preferably has a plurality of pixels.

The present invention furthermore relates to an example vehicle, preferably to an autonomous motor vehicle have an environment sensor system as described above. The environment sensor system is able to perform in particular an environment detection and an environment recognition. The example vehicle comprises preferably a control unit, which is designed to operate the vehicle autonomously on the basis of the environment recognition.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
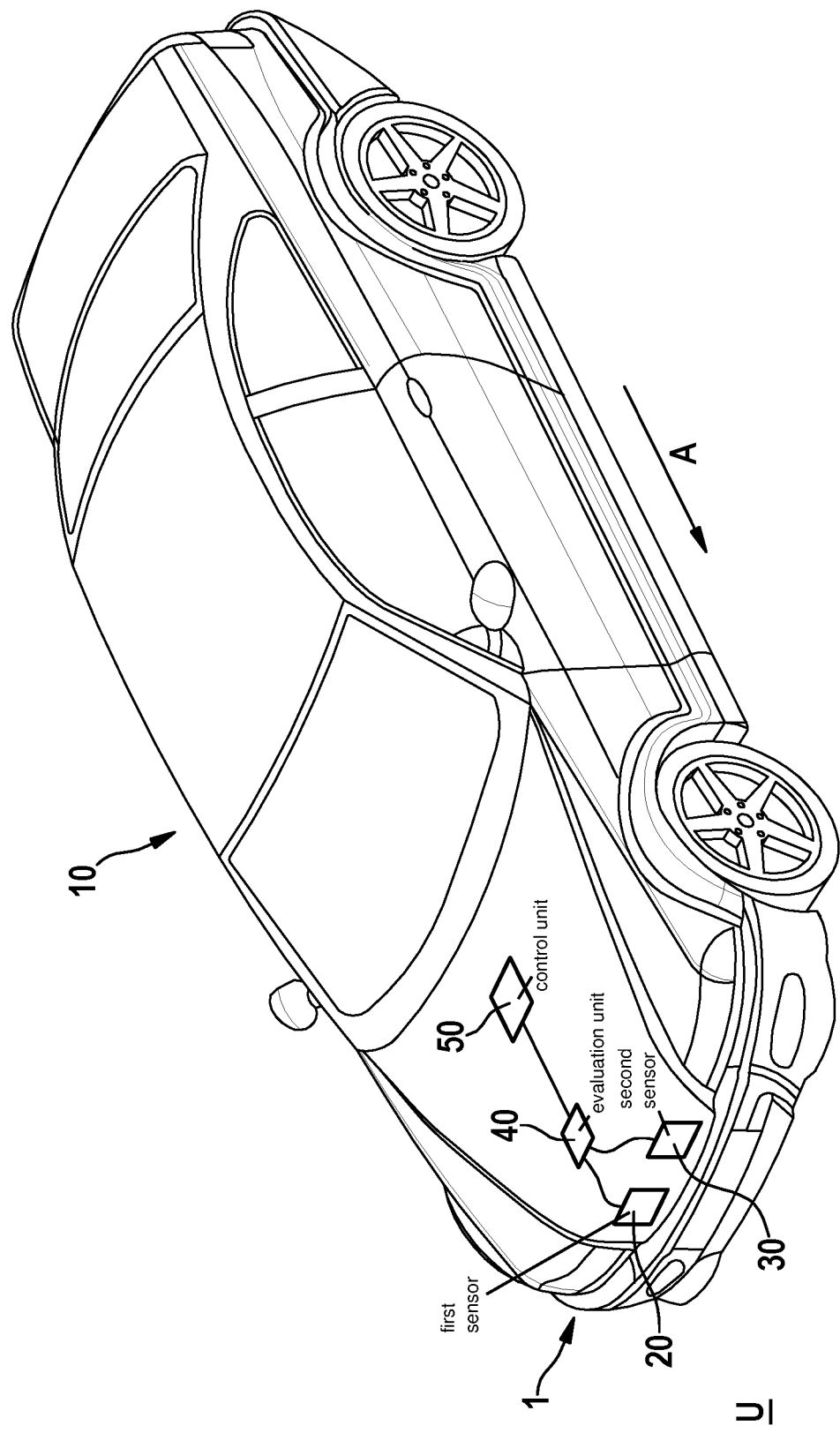
FIG. 1 shows a simplified perspective view of a vehicle having an environment sensor system according to a preferred exemplary embodiment of the invention.
Figure 2:
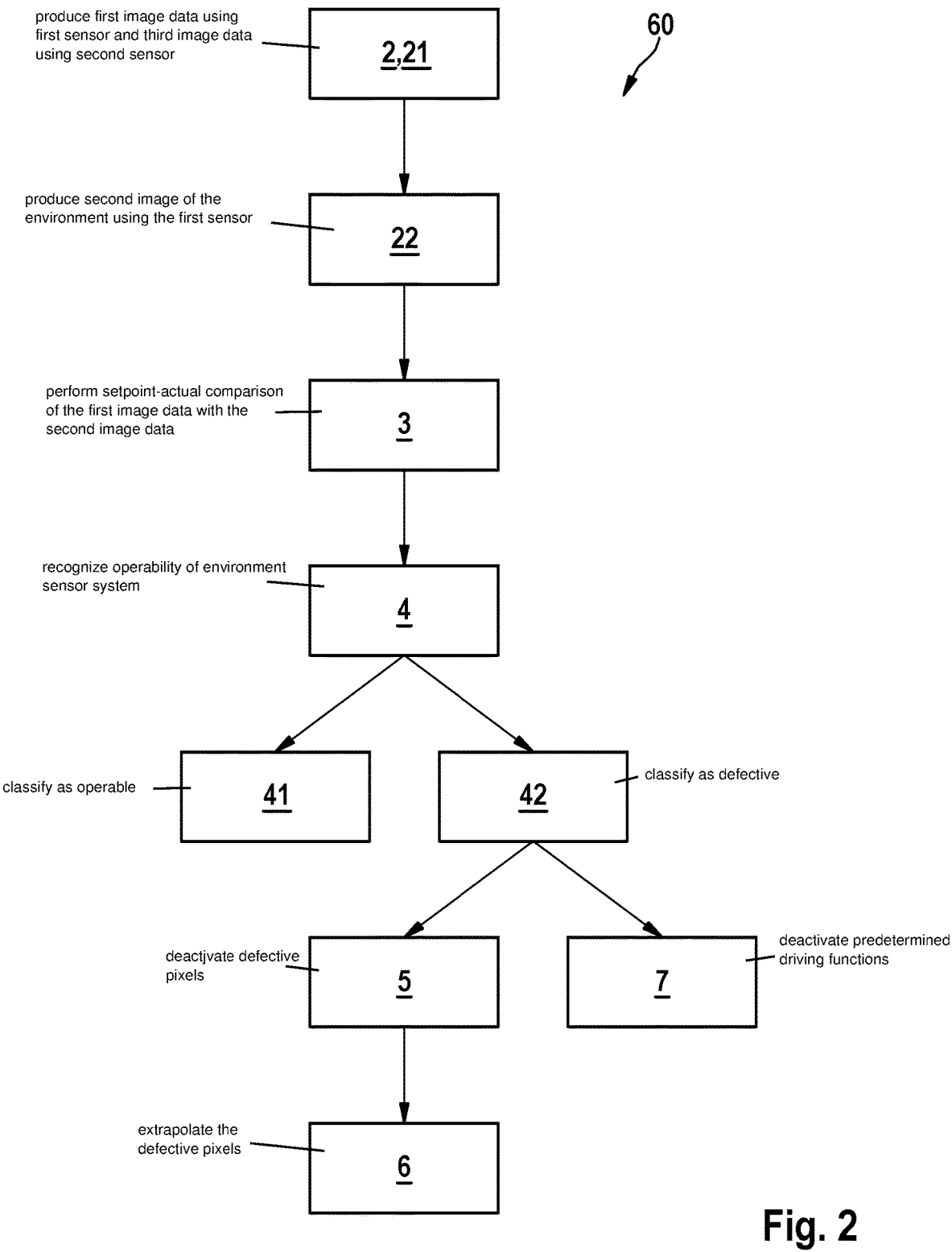
FIG. 2 shows a highly simplified schematic view of a method for operating the vehicle of FIG. 1.

FIG. 1 shows a perspective view of a vehicle 10 having an environment sensor system 1 according to a preferred specific embodiment of the present invention. Vehicle 10 is an autonomously operable motor vehicle. FIG. 2 shows an example method 60 for operating vehicle 10 of FIG. 1 in accordance with the present invention.

Environment sensor system 1 is designed to detect an environment U of vehicle 10 and to produce environment image data. The environment image data comprise in this case first image data and third image data. For detecting the environment image data, environment sensor system 1 comprises a first sensor 20, which is designed to produce the first image data from a first image of the environment U. Environment sensor system 1 furthermore comprises a second sensor 30, which is designed to produce the third image data from a second image of the environment U. The two sensors 20, 30 are situated in a front area of vehicle 10 viewed in driving direction A. The two sensors 20, 30 are furthermore optical sensors, which are developed as cameras in the preferred exemplary embodiment.

Environment sensor system 1 furthermore has an evaluation unit 40, which is designed to analyze the environment image data. For this purpose, an object recognition is performed on the basis of the environment image data. The information resulting from this object recognition is provided to a control unit 50 of vehicle 10. Control unit 50 is designed to control vehicle 10 autonomously, that is, to enable fully automated driving, or VAF, of vehicle 10.

When operating vehicle 10, that is, in particular in driving operation, impairments of the environment sensor system 1 may arise, due to contaminations by environmental influences and/or defects of first sensor 20 and/or of second sensor 30. In order to be able to recognize such impairments as early and as reliably as possible, and in order to avoid a possible erroneous environment detection, the method 60 represented in FIG. 2 is provided for operating vehicle 10 and environment sensor system 1.

Method 60 begins with the above-described step of producing first image data 2 using first sensor 20. At the same time, the third image data are produced 21 using second sensor 30.

In the next method step, a second image 22 of the environment U is produced using first sensor 20. Second image 22 is produced at a later point in time than the production of first image 2. In the preferred exemplary embodiment, a second image 22 is produced five minutes after the production of the first image 2. Items of image information from the second image form second image data, which are used to assess the operability of the environment sensor system in the two subsequent steps 3 and 4. For this purpose, the second image data additionally comprise standard image data, which are stored in first sensor 20. The standard image data include an image of a standard surface. In detail, the standard image data have ideal signal strengths, which were obtained for example in a manufacture or calibration of the first sensor by way of the standard surface.

To assess the operability of the environment sensor system 1, evaluation unit 40 is furthermore designed to perform a setpoint-actual comparison 3 of the first image data with the second image data, as shown in FIG. 2 as step 3. On the basis of this setpoint-actual comparison 3, the operability 4 of the environment sensor system is subsequently recognized by evaluation unit 40. For this purpose, evaluation unit 40 comprises a first artificial intelligence. The setpoint-actual comparison 3 is analyzed by the first artificial intelligence. For this purpose, all pixels of first sensor 20 are checked for operability. That is to say, for each pixel of first sensor 20, a setpoint-actual comparison 3 is performed with corresponding image information of the second image data. On this basis, the operability 4 of the respective pixel is recognized. Using the artificial intelligence, evaluation unit 40 is able to assess whether the currently considered pixel detected meaningful and realistic image information. A not (sufficient) operability may be recognized in that the artificial intelligence recognizes whether the considered pixel is unchanged over time, that is, if it has approximately the same signal strength in the second image data as in the first image data. Alternatively or additionally, the artificial intelligence may assess whether the image information of the considered pixel is in a realistic range in relation to the standard image data, or whether it is darkened excessively for example.

If the recognition of operability 4 yields the result that environment sensor system 1 is not impaired and is fully operable, environment sensor system 1 is accordingly classified as "operable," which is represented by step 41 of method 60. Subsequently, the method may be executed anew, either immediately afterwards or after the expiration of a predefined time period, for example 30 minutes.

If it is recognized, however, that environment sensor system 1 is at least partially defective due to a contamination or a defect of pixels, then method 60 is continued with step 42, in which environment sensor system 1 is classified as "defective" or as "partially defective". On this basis, two alternative method steps are subsequently possible, which are performed as a function of a degree of operability. The degree of operability is assessed in step 42.

If the degree of operability is less than 50% for example, that is, if 50% or more of the pixels of first sensor 20 are contaminated and/or defective, then predetermined driving functions 7 are deactivated in response. In this case, driving functions are deactivated, in particular autonomous driving functions, which otherwise use the first image data of the first sensor 20, such as an adaptive cruise control for example. Alternatively, an environment sensor system may also be switched over to a still operable redundant environment sensor. This makes it possible to avoid unfavorable driving situations due to a faulty detection on the part of environment sensor system 1.

If the degree of operability is 50% or greater, but less than 100%, measures may subsequently be initiated in method 60, which may increase the performance of the environment sensor system. For this purpose, first the pixels identified and classified as defective are deactivated 5. This prevents the defective pixels from falsifying the totality of the first image data.

The method furthermore comprises a step of extrapolating 6 the defective pixels. For this purpose, evaluation unit 40 additionally comprises a second artificial intelligence, which performs the extrapolation 6. Both image information of operable pixels adjacent to the defective pixels as well as image information of the third image data of the second sensor 30 are used for this purpose, in order to obtain a particularly high accuracy. On account of the extrapolation 6, the environment sensor system 1 is able to continue to provide a good base performance in the recognition of objects.

What is claimed is:

1. A method for operating an environment sensor system of a vehicle, comprising the following steps:
   producing first image data from a first image of a vehicle environment using a first sensor;
   performing a setpoint-actual comparison of the first image data with second image data; and
   recognizing an operability of the environment sensor system based on the setpoint-actual comparison;
   wherein the second image data includes standard image data and/or image information, from a second image of the vehicle environment; and
   the operability is recognized using a neural network of a first artificial intelligence, wherein the neural network is configured for object recognition including recognition of at least a portion of an object in the second image,
   wherein information resulting from the object recognition is provided to a control unit of the vehicle,
   wherein the control unit is configured to control the vehicle autonomously.

2. The method as recited in claim 1, wherein the vehicle is an autonomous vehicle.

3. The method as recited in claim 1, wherein the operability is recognized separately for each pixel of the first sensor.

4. The method as recited in claim 3, further comprising the following step:
   deactivating defective pixels of the first sensor.

5. The method as recited in claim 4, further comprising the following step:
   extrapolating defective pixels.

6. The method as recited in claim 5, wherein the extrapolation is performed by the first artificial intelligence and/or by a second artificial intelligence.

7. The method as recited in claim 6, wherein image data areas that are unchanged over time are recognized using the first artificial intelligence and/or the second artificial intelligence, and the image data areas unchanged over time are classified as defective.

8. The method as recited in claim 5, wherein the extrapolation is performed using image information of adjacent pixels.

9. The method as recited in claim 5, wherein the extrapolation is performed using third image data of a second sensor.

10. The method as recited in claim 1, wherein the second image of the vehicle environment is produced at a different point in time than the first image.

11. A method for operating an autonomous vehicle, comprising the following steps:
    operating an environment sensor system of the vehicle, including:
       producing first image data from a first image of a vehicle environment using a first sensor;
       performing a setpoint-actual comparison of the first image data with second image data; and
       recognizing an operability of the environment sensor system based on the setpoint-actual comparison;
       wherein the second image data includes standard image data and/or image information, from a second image of the vehicle environment; and
       the operability is recognized using a neural network of a first artificial intelligence, wherein the neural network is configured for object recognition including recognition of at least a portion of an object in the second image,
    wherein information resulting from the object recognition is provided to a control unit of the vehicle,
       wherein the control unit is configured to control the vehicle autonomously; and
    deactivating predetermined driving functions of the vehicle when a degree of the operability of the environment sensor system is smaller than a predetermined degree of the operability, and/or switching over the environment sensor system to use an intact, redundant, third sensor when the first sensor is defective.

12. An evaluator, comprising:
    a first artificial intelligence;
    wherein the evaluator is configured to:
       receive first image data from a first image of a vehicle environment from a first sensor;
       perform a setpoint-actual comparison of the first image data with second image data, wherein the second image data include standard image data and/or image information from a second image of the vehicle environment; and recognize an operability of an environment sensor system based on the setpoint-actual comparison using a neural network of the first artificial intelligence, wherein the neural network is configured for object recognition including recognition of at least a portion of an object in the second image, wherein information resulting from the object recognition is provided to a control unit of a vehicle, wherein the control unit is configured to control the vehicle autonomously, wherein the evaluator is configured to detect the operability for each pixel of the first sensor separately, wherein the first image data have a signal strength of pixels of the first sensor and/or a noise value, and the evaluator is configured to detect the signal strength and/or the noise level.

13. An environment sensor system of a vehicle, comprising:

a first sensor configured to produce first image data from an image of a vehicle environment; and an evaluator including a first artificial intelligence, wherein the evaluator is configured to:

receive first image data from a first image of a vehicle environment from the first sensor;

perform a setpoint-actual comparison of the first image data with second image data, wherein the second image data include standard image data and/or image information from a second image of the vehicle environment; and recognize an operability of an environment sensor system based on the setpoint-actual comparison using a neural network of the first artificial intelligence, wherein the neural network is configured for object recognition including recognition of at least a portion of an object in the second image, wherein information resulting from the object recognition is provided to a control unit of the vehicle, wherein the control unit is configured to control the vehicle autonomously.

14. A vehicle, comprising:

an environment sensor system including:

a first sensor configured to produce first image data from an image of a vehicle environment; and an e evaluator including a first artificial intelligence which includes a neural network configured for object recognition, wherein information resulting from the object recognition is provided to a control unit of the vehicle, wherein the control unit is configured to control the vehicle autonomously, wherein the evaluator is configured to:

receive first image data from a first image of a vehicle environment from the first sensor;

perform a setpoint-actual comparison of the first image data with second image data, wherein the second image data include standard image data and/or image information from a second image of the vehicle environment; and recognize an operability of an environment sensor system based on the setpoint-actual comparison using a neural network of the first artificial intelligence, wherein the neural network is configured for object recognition including recognition of at least a portion of an object in the second image.

* * * * *